United States Patent
Smith

[11] 3,797,352
[45] Mar. 19, 1974

[54] APPARATUS FOR KEYING AND LOCKING ELEMENTS TO THEIR RETAINERS

[75] Inventor: Robert E. Smith, Kettering, Ohio

[73] Assignee: Dayton Progress Corporation, Dayton, Ohio

[22] Filed: Jan. 26, 1973

[21] Appl. No.: 326,582

[52] U.S. Cl.................................. 83/699, 279/87
[51] Int. Cl............................ B26f 1/14, B26d 7/26
[58] Field of Search ............ 83/698, 699, 700, 685, 83/686, 690; 279/87

[56] References Cited
UNITED STATES PATENTS
3,535,967  10/1970  Whistler, Sr. .................... 83/698
3,640,170  2/1972  Bennett ............................ 83/698

Primary Examiner—Willie G. Abercrombie
Attorney, Agent, or Firm—Jerome P. Bloom

[57] ABSTRACT

This is a system and apparatus for keying and locking tools and like elements such as punches and die and guide buttons in the appropriate bores of their retainers. The system requires the formation of a flat on the head end of the element to be inserted and locked in a retainer bore while the wall of the bore to position opposite the flat is drilled and reamed, in an axial sense, to provide parallel pin holes which open at one side to the bore. Each pin hole receives a dowel type pin which, however, has a flat along one side portion. The flat on the pin is positioned to be exposed to the bore and to generally face the flat on the inserted tool. The dowel pins are specially designed to include a taper which enables a preliminary non-seated positioning of the respective pins in their holes while the related tool is inserted in the associated bore, whereupon each pin is rotatively positioned as required to abut the flat on the inserted tool. The pins are then driven to a seated locking position referenced to the flat on the tool. The use of plural pins, so formed and utilized, eliminates the need for close tolerance in machining the related parts and insures a precise and simple procedure in the locking of a tool or other element in a desired orientation and place.

12 Claims, 7 Drawing Figures

PATENTED MAR 19 1974  3,797,352
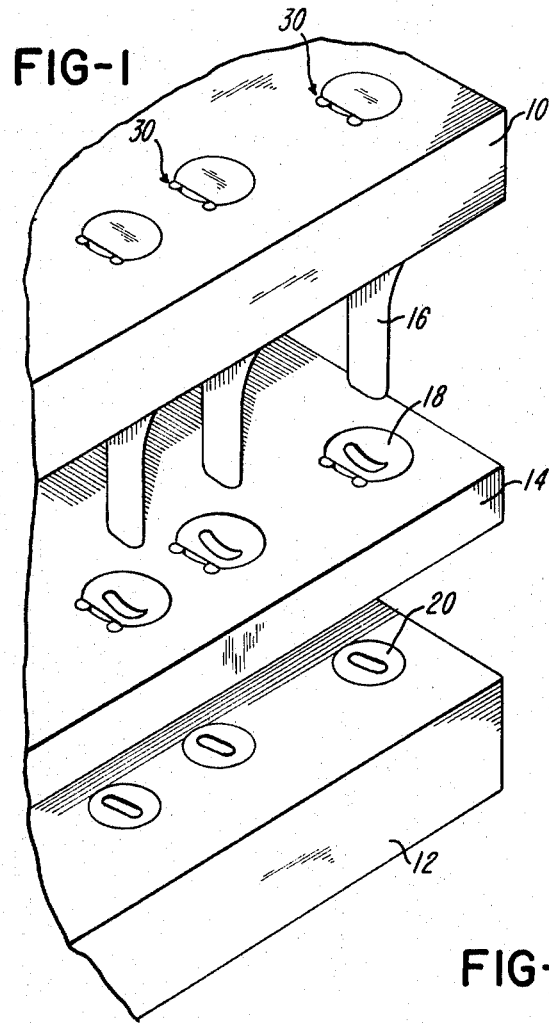
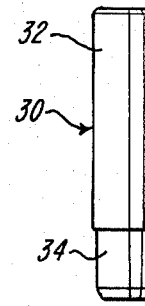
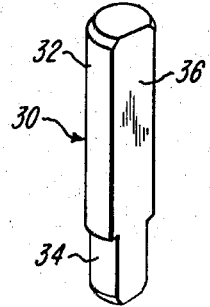
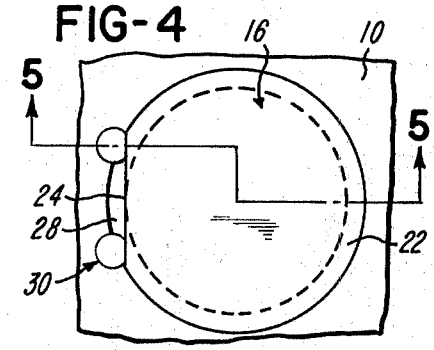
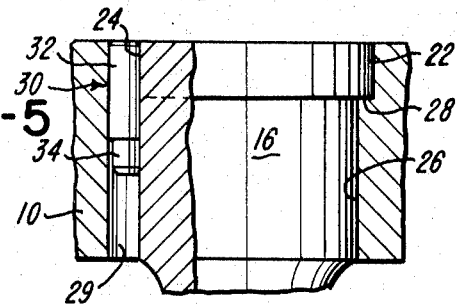
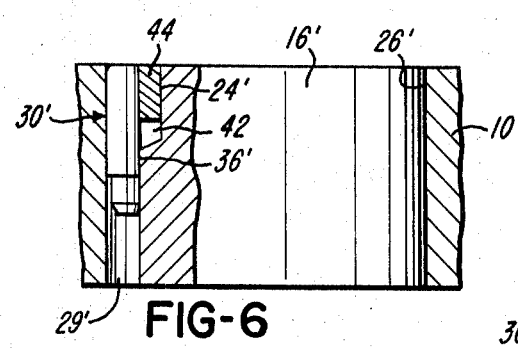
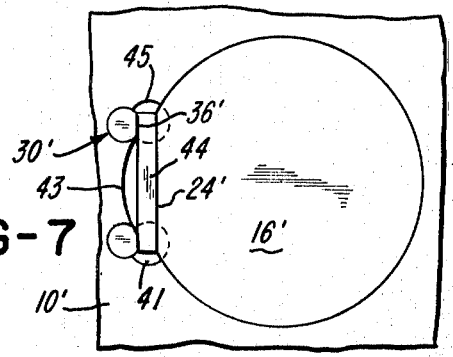

APPARATUS FOR KEYING AND LOCKING ELEMENTS TO THEIR RETAINERS

BACKGROUND OF THE INVENTION

This invention relates to a new and improved system and apparatus for keying and locking an element in a precisely required position referenced to a retainer. It has particular and significant advantage for use in the tool and die industry and will be so described though not so limited in application. A most important application is its use to key and lock in place such items of a die as punches, related guide and die buttons, and other elements having like function.

While there are many methods utilized for orienting and locking perforator type tools to their retainer, they all present disadvantages and problems of serious concern.

One such method is the dowel-slot method. In use of this method a hole for a dowel is machined partially in a tool head, in a sense tangent to its body, and partially in the wall surface of the tool accommodating bore. The procedure requires pre-drilling, reaming and jig grinding to extremely close tolerance. Not only is the nature of these operations such to substantially increase set up and machining costs but in use thereof there is much difficulty found in attempting to achieve a proper fit and in maintaining a proper position of the tool. An important objection to use of the dowel-slot method is that it inherently makes interchanging or replacement of a tool extremely difficult. This becomes obvious when one considers the need either to machine a slot in a replacement tool which is highly critical as to dimension and orientation or to rework the whole retainer-tool assembly to accommodate a different dowel pin. The latter is quite impractical and problems are compounded when dealing with tools such as headless perforators.

Another method of the prior art is the key-flat method. This is most commonly used to date and requires that a flat be ground on the head of a perforator, for example, in a sense tangent to its body. A related key requires that an accommodating pocket be milled in the wall of the bore of the retainer which is to receive the perforator. In use of this method, if there is any variation in the diametric tolerance of the perforator body, it is reflected in the fit from the center of the perforator to the edge of the related key. Since such variation is the rule rather than the exception, each key must be specially ground to achieve a seating and a press fit in its milled pocket so as to precisely position the perforator by engagement with its flat. Normally, where the key must be held down, a precisely positioned tapped hole must be formed therein to receive a screw. Accordingly, the method inherently dictates the need for a new key to be fit every time a tool must be removed and replaced. Also difficulties basically reside in milling a pocket for each key. Where a number of tools, such as perforators, are to be held in a single retainer, these problems are also compounded. Machining obviously becomes more difficult and critical where the holes for locating perforators in a single retainer are in a close pattern.

In the double flat method of the prior art, the head of a tool, such as a perforator, requires the forming thereon of precisely parallel flats. There also must be precisely square grinding of related slots in the wall of the tool accommodating bore. Use of this method limits the tool area in a retainer, an obvious disadvantage. Moreover, the flats must initially be formed with excess stock, since custom fitting is required in each application of a perforator. This means it is impossible to standardize procedures in application of perforators or any other element to a retainer using this method. Maintenance costs in use thereof will in any event be extremely high.

SUMMARY OF THE INVENTION

The present invention substantially eliminates the basic problems and disadvantages of prior art practice in locking elements such as perforating and forming tools and guide and die buttons to their retainers, in a required position for use.

In accordance with the invention the element, a perforator for example, which is to be inserted in a bore of a retainer and fixed in a required position for use, is formed with a flat on its head end. This flat, however, need not be held to a close tolerance. Used in conjunction with the flatted portion of the perforator are two specially designed pins, which also have flats. In the area thereof to accommodate the flatted head of the perforator, the bore wall is intersected by a pair of circularly spaced, axially directed, holes which are drilled and reamed in the retainer. These holes accommodate the aforementioned pins and where the bore wall is intersected thereby, portions of the outer surface of the pins will project interiorly of the bore. When the perforator is inserted in its bore, the flat on its head end is positioned approximately parallel to the holes which open to the bore, whereupon the pins may be inserted and rotatively adjusted to abut the flat on the perforator as it is adjusted to its required position of use. On driving the pins into their holes the perforator is locked precisely in its required orientation and place. The pins are designed to facilitate their ready end positive application.

The system and apparatus is such that the perforators may be provided with essentially standardized flats while the inexpensive pins employed may be furnished in similar shape but in various sizes to meet a wide variety of applications. The concept eliminates the need for a press fit tolerance between a perforator body and its bore to be closely held.

Of course the reference to a perforator is purely illustrative since the invention is applicable to any element required to be similarly locked to its retainer.

A primary object of the invention is to provide an improved system and apparatus for keying and locking tool and die elements to their retainers which is economical to fabricate, more efficient and satisfactory in use, adaptable to a wide variety of applications and unlikely to malfunction.

A further object of the invention is to provide improved means for keying a cylindrical object to a retainer in a prescribed position of use.

Another object of the invention is to provide a system for keying perforating and forming tools and their guides to their retainers featuring a novel pin as a key type positioning device.

An additional object of the invention is to provide a novel pin type device usable to more effectively key the head or body of a tool to its retainer which eliminates the need for highly critical dimensioning and machining procedures in order to insure proper fit and position of the tool.

Another object of the invention is to eliminate the need for custom forming and fitting of tool and die parts for their application to their retainers.

A further object of the invention is to provide a simple means and system for standardizing tools and other elements which must be fixed in predetermined positions for proper use thereof.

Another object of the invention is to provide systems and apparatus of the type described possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein some but not necessarily the only forms of embodiment are shown, FIG. 1 is a perspective fragmentary view of a die set embodying the system and apparatus of the invention;

FIG. 2 is a side view of a new pin type keying device in accordance with the present invention;

FIG. 3 is a perspective view of the pin of FIG. 2;

FIG. 4 is an enlarged view of the head end of a perforator as keyed in a retainer per the illustration of FIG. 1;

FIG. 5 is a view taken on line 5—5 of FIG. 4;

FIG. 6 shows a view similar to FIG. 5 illustrating the invention as applied to headless die and guide inserts; and FIG. 7 is a head end view of the structure of FIG. 6.

Like parts are indicated by similar characters of reference throughout the several views.

Referring to the drawings FIG. 1 illustrates a die set in fragmentary form to basically comprise a punch retainer plate 10, a base die plate 12 and an intermediate stripper plate 14. As diagrammatically shown, the plate 10 mounts, in fixed relation thereto, a plurality of punch type perforators 16 vertically aligned with guides 18 fixed in holes in the stripper plate 14 and die buttons 20 fixed in accommodating holes in the die plate 12.

In use the punch plate 10 will be fixed to the head of a reciprocable ram providing thereon an upper die shoe (not shown) and die plate 12 will be fixed to a base providing a lower die shoe (not shown). The stripper plate 14 will, of course, be resiliently suspended from the punch plate 10 in a conventional manner. This provides the environment of the present invention as here illustrated. As will be obvious, only so much of a die is here shown as may be necessary for an understanding of the present invention.

As illustrated, the punch type perforators 16 as well as the guides 18 are each formed and locked in their retainers in accordance with the present invention. Since the concept is the same in each case, a description of the keying and locking of a single perforator should suffice for an understanding of the present invention.

Each perforator shown in FIGS. 1–5 of the drawings is of the headed type. This means that the head end of its body 16 is enlarged by a peripherally projected annular flange 22. The flange 22 is provided with a flat 24. The flat 24 is formed by a cut which intersects the flange in a plane which is generally tangent to the perforator body. This flat need not be held to close tolerance.

For mount thereof the body of perforator 16 is inserted in a bore 26 of the plate 10. A counterbore 28 in the uppermost surface of the plate 10 is designed to expand the upper end of bore 26 to nest the flange 22 at the head end of the perforator body. A press fit tolerance between the perforator body 16 and the bore 26 need not be rigidly held.

The peripheral wall of the counterbored portion 28 of the bore 26 is intersected at one side thereof by two parallel slots which are closely spaced. These slots are defined by two axially directed, relatively closely spaced holes 29, drilled perpendicular to the upper surface of plate 10. The holes 29 are parallel to the bore 26 and may be drilled all the way through or partially through the plate. In any case the depth of each is greater than that of flange 22 to receive a pin 30 as seen in the drawings. In cross-section, the pin 30 has the peripheral configuration of a circle interrupted at a chord thereof, the arc portion being formed on a uniform radius and having a circumferential extent which is greater than 180°. This cross-section is achieved by taking a cylindrical pin and machining a flat 36 on one side, to extend the length of the pin. As seen in FIGS. 2 and 3 the pin is comprised of a lead section 34 which is relatively reduced in cross section relative the remainder of the body thereof which is identified by the numeral 32. It is noted the flat 36 is ground at a slight taper, for example a .001"/inch taper, the length of the pin. This provides for the distance from the flat to the center of the pin to vary and to be the least at the lead end of the pin. This lends a capability to compensate for tolerance differences in the perforator and to set a rotational position thereof as will be further described. Where the hole 29 is a blind hole or cavity, the blind portion will have an aperture for insertion of a tool to eject the contained pin as and when required.

In assembling the perforator, it is first dropped into its bore 26 so the flange 22 thereof seats to the shoulder formed therein by the counterbore 28. It is rotatively positioned so the flat 24 is generally parallel to the plane defined by the holes or cavities (depending on their depth) 29. A pin 30, appropriately sized for the application is dropped in each hole 29, the introduction being facilitated by the reduction at the lead end thereof. The positions of holes 29 relative the peripheral wall of counterbore 28 provides that the slots formed thereby will be wider than the flats 36 on the pins and a significant portion of the pins including the flats 36 will be presented in the counterbored area. As will be seen in FIG. 4 the pins 30 as well as the perforator may be rotated to precisely position the perforator referenced to the related guide 18 and die button 20. With this position established, in the case illustrated the flats 36 on the pins 30 generally abut the flat 24, whereupon, they are driven in to lock the perforator in place, in its position of use. The pins may be driven till the heads are flush with the upper surface of plate 10 or deeper if required to take up space between their flats and the flat 24.

In accordance with the invention pins may be provided in various sizes, with various width flats and with a variable spacing of the flat from the center of the pin. This means that no hole or bore tolerance need be closely held and pins may be selectively applied to precisely suit the application and to insure a precise position of the flat 24 on the perforator as it is locked in place. It is to be understood, however, that by reason of the form of the pins, they have a significant range to accommodate variation in fit of the perforator and they themselves can be simply rotated if required to establish that a portion thereof will have an insured bearing contact with the flat 24 in its required position. The optimal position will however be as illustrated with flats 36 and 24 flush abutted and can be normally achieved with reasonable variation in established tolerances which in any event need not be critically held. Attention is directed to the fact that the pins 30 are securely contained in the holes 29, which insures a firm and seated backing and retention thereof in use.

The important benefits of the key-lock system of the invention should be self-evident. The locations of holes 29 provides a web therebetween giving a multiple reinforcement to the key structure within the retainer plate. It also permits the perforator to be removed without necessarily removing pins 30, if such is desired. By tape control, a set relation of the two holes 29 and the perforator bore may be early established in the first instance. This produces, very simply, critical control points and enables that holes or bores used merely be drilled and reamed. Tolerances can be 0.0002 inch and even somewhat greater. For example there can be a ±0.0005 inch spread from the center line of the perforator and between the two pins. This dictates economy in use of the system and enables that the components used therein may be standardized and made shelf type items.

An important result of the system and apparatus of the invention is the reliability and repeatability of alignment, within 0.0001 inch and 0.0002 inch in width of the flat on the perforator component. This is well within the tolerances required for efficient reassembly during maintenance procedures.

While the invention has been described in reference to placement and lock of a perforator, obviously the concept is equally applicable to any element required to be locked to and precisely positioned in a retainer.

FIGS. 6 and 7 of the drawings illustrate the manner of its application to a headless element, such as a headless perforator. In this case the head end of the perforator 16' (which has no flange) is cut back to produce a flat 24' thereon which is inset from its outer periphery. This flat positions uppermost as the perforator is inserted in a bore 26' of the plate 10' corresponding to plate 10. At its uppermost end, and to one side thereof the bore 26' is expanded by an arcuate cut, in the wall thereof, the depth of flat 24'. This produces an offset arcuate wall segment 43 formed on a radius smaller than that of bore 26' the ends of which connect to the wall of the bore by short offset wall segments 45 formed by small holes 41 drilled in the upper surface of plate 10'. The purpose of this will soon be obvious.

In this case the holes 29' (corresponding to previous holes 29) are drilled in the upper surface of retainer plate 10' to form parallel slots opening to the bore in the area between adjacent extremities of wall segments 43 and 45.

As the perforator 16' is inserted in bore 26', it is rotated so its flat 24' is caused to face the plane defined by the holes 29'. The pins 30' corresponding to pins 30, as previously described, are inserted in holes 29' to have flatted portions 36' thereof face the flat 24', whereupon a flat key 44 is applied therebetween. In this case the key 44 projects the surface of flat 24' and the pins 30' make spaced contact therewith in a manner as previously described with reference to flat 24.

The expansion of the bore 26' in the upper end thereof is sufficient, as seen in FIG. 7, to accommodate the ends of key 44 in offsets provided in the bore wall by the wall segments 45, with sufficient clearance to permit rotation of the perforator and its flat for precise positioning thereof. Moreover, the pins 30' may be selectively applied, in a size to suit the application, and rotated in their holes to make bearing contact with the key 44 to fix the same and the perforator in place. The key acts as a wedge as it and the pins are simultaneously driven into plate 10'. The perforator is simply and precisely locked in place thereby.

Substantially all the advantages previously described are available in use of the invention in reference to headless elements. As will be obvious, the clearance required to seat key 44, the extra element, is not critical. Once a standard key size is determined for an application, any variation in tolerance is again compensated for by the selection of the positioning and locking pins 30' in appropriate sizes.

From the foregoing it should be clear that the invention has considerable significance in that critical machining practices which create problems and increase initial die cost and maintenance thereof have been eliminated by the invention. Moreover, the invention contributes to the primary objective of standardization of parts for various application.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

I claim:

1. Apparatus for locking an element in a required position of use, within a bore or recess of a retainer, characterized by a flat formed on one side portion of said element which disposes in said bore or recess, said retainer having a plurality of holes or cavities therein opening to the said bore or recess in the area of said flat and means received in each said hole or cavity at least a portion of which projects in said bore or recess to abut said flat, the projected portions of said means in said holes or cavities providing for selective and plural engagement of said flat at relatively spaced surface portions thereof to precisely position said flat and said element thereby in a required position of use and said means within said holes or cavities providing means to fix said element in place by a locking engagement thereof to said flat.

2. Apparatus as in claim 1 characterized by said holes being axially directed in a generally parallel orientation and said means received therein having a pin-like form.

3. Apparatus as in claim 2 characterized by there being two said holes the axes of which are generally parallel to the axis of said bore or recess, said means of pin-like form including surface portions which project laterally into said bore or recess, and by rotative position thereof are adapted to engage selected portions of the flat on said element to orient and fix the same in place.

4. Apparatus as in claim 3 wherein said means of pin-like form having a longitudinally tapered surface portion facilitating the introduction thereof in said holes and the cross section thereof being determinative of the extent said surface portions project laterally into said bore or recess.

5. Apparatus as in claim 4 wherein said means of pin-like form include flatted surface portions which may be presented interiorly of said bore or recess to abut relatively spaced surface portions of said flat.

6. Die apparatus as in claim 1 wherein said element is a die tool the head end of which has an external flange seating in a complementarily expanded portion of said bore or recess, said flat being provided on said flange and said means received in each said hole or cavity having flatted portions positioning said tool by interrelation with the flat on said flange.

7. Apparatus for locking an element in a required position of use, within a bore or recess of a retainer, a portion of said element disposing within said bore or recess, characterized by said retainer having a plurality of holes or cavities portions of which are open to said bore or recess and means disposing partially in said bore or recess and in said holes or cavities arranged to effect a position and lock of said element to said retainer in a required position of use, said means including a pair of pins the positions of which are determinative of the fixed position of said element.

8. Apparatus as in claim 7 wherein said holes or cavities comprise a pair of laterally spaced holes or cavities and said pins dispose partially therein and partially in said bore or recess to position and fix said element by direct engagement with spaced portions thereof.

9. Apparatus as in claim 7 wherein a side portion of said element includes a flatted portion, said pins are non-circular in cross section and said element and pins are rotatable to establish a required relation therebetween to determine the desired fixed position of said element.

10. Apparatus as in claim 9 wherein a plate-like insert is interposed between said pins and said flatted portion of said element to lock said element in its retainer.

11. Apparatus as in claim 7 wherein said pins have a generally parallel spaced relation and a non circular cross section in respect to at least those portions thereof partially in said holes or cavities and partially in said bore or recess and the rotation thereof providing spaced points within said recess or cavity which determine the required position of said element with respect to said retainer.

12. Die apparatus as in claim 7 wherein said element is an operative insert in a tool or die plate and said flat is formed thereon and said pins including flatted portions functionally related to said flat to control the rotative position thereof in said bore or recess in said retainer.

* * * * *